(12) United States Patent
Gordon

(10) Patent No.: US 6,663,067 B2
(45) Date of Patent: Dec. 16, 2003

(54) RETRACTABLE COAT HOOK

(75) Inventor: Gary G. Gordon, Novi, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/060,537

(22) Filed: Jan. 30, 2002

(65) Prior Publication Data

US 2003/0141423 A1 Jul. 31, 2003

(51) Int. Cl.[7] .............................................. E04G 3/00
(52) U.S. Cl. ................. 248/294.1; 224/553; 248/291.1; 248/304
(58) Field of Search ............................... 248/304, 305, 248/306, 308, 322, 339, 291.1, 292.13, 292.14, 294.1; 224/553, 313, 583; 24/305, 308

(56) References Cited

U.S. PATENT DOCUMENTS

| | | | | |
|---|---|---|---|---|
| 633,742 | A | * | 9/1899 | Turner ...................... 248/294.1 |
| 2,602,622 | A | * | 7/1952 | Smith ....................... 248/291.1 |
| 3,385,547 | A | * | 5/1968 | West .......................... 248/308 |
| 4,221,354 | A | * | 9/1980 | Kempkers ................ 248/291.1 |
| 4,720,028 | A | * | 1/1988 | Takemura et al. .......... 224/553 |
| 4,787,590 | A | * | 11/1988 | Melvin ..................... 248/291.1 |
| 5,507,423 | A | | 4/1996 | Fischer et al. |
| 5,769,294 | A | * | 6/1998 | Heinz et al. ................. 224/567 |
| 5,820,205 | A | * | 10/1998 | Ammons ..................... 296/214 |
| 6,095,469 | A | | 8/2000 | Von Alman |
| 6,109,579 | A | * | 8/2000 | Huang ...................... 248/294.1 |
| 6,457,690 | B1 | * | 10/2002 | Spykerman et al. ......... 248/305 |

FOREIGN PATENT DOCUMENTS

| | | |
|---|---|---|
| DE | 29915935 | 11/1999 |
| EP | 0985581 | 3/2000 |
| JP | 260735 | 9/2001 |

* cited by examiner

*Primary Examiner*—Ramon O Ramirez
*Assistant Examiner*—Tan Le
(74) *Attorney, Agent, or Firm*—Tarolli, Sundheim, Covell & Tummino, L.L.P.

(57) ABSTRACT

A coat hook assembly (10) includes a hook member (80) for connection with a structure (12). The hook member (80) is supported for pivotal movement from an opening (40) and from a stored position to an operative position. The hook member (80) has a hook portion (82) adapted to support a garment. The hook member (80) has a closure portion (84) fixed for pivotal movement with the hook portion (82), and blocking the opening (40) when the hook member is in the stored position. A latch mechanism (120) releasably hold the hook member (80) in the stored position. The latch mechanism (120) is responsive to a pushing force on the hook member (80) when in the stored position to release the hook member for pivotal movement from the stored position to the operative position.

21 Claims, 3 Drawing Sheets

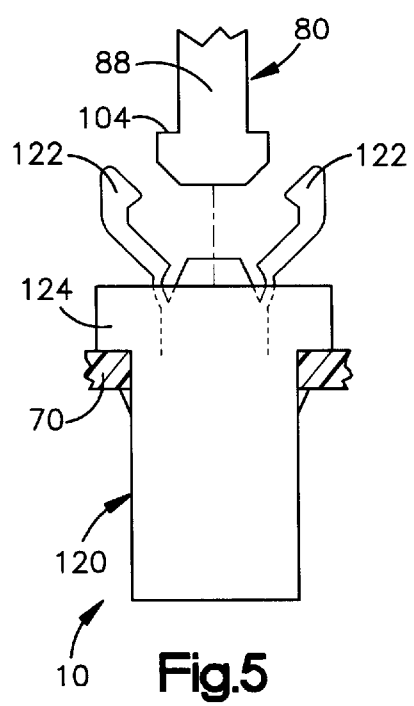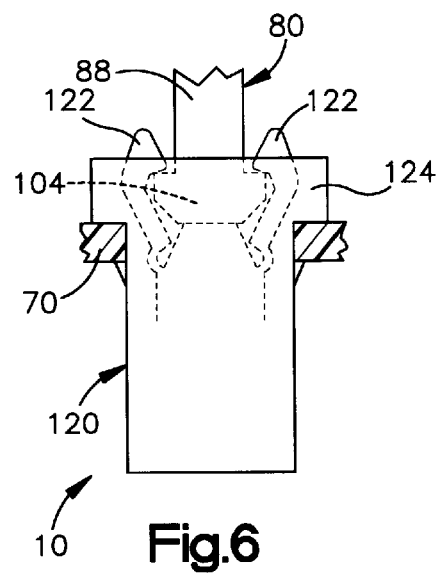

US 6,663,067 B2

RETRACTABLE COAT HOOK

BACKGROUND OF THE INVENTION

1. Technical Field

The present invention relates to a retractable coat hook and, in particular, to a retractable coat hook that can be mounted on a structure, such as a wall panel or a vehicle.

2. Description of Related Art

Some structures, such as furniture, and automobiles, have one or more coat hooks for hanging a garment. The coat hook may be of a type that pivots downward from a stored position into an operative position. The coat hook may, alternatively, slide out from the stored position.

U.S. Pat. No. 5,507,423 discloses a push-push vehicle clothes hook assembly in which the coat hook moves linearly out from a cavity in the roof rail to a hanging or operative position. When the coat hook is in the operative position, the cavity is exposed.

U.S. Pat. No. 6,095,469 discloses a coat hook assembly including a coat hook that pivots outward from an opening in the roof rail to a hanging or operative position. As this occurs, a separate closure panel pivots relative to the coat hook to a position filling the opening, to provide a finished appearance to the vehicle interior.

SUMMARY OF THE INVENTION

The present invention is an apparatus comprising a hook member for connection with a structure. The hook member is supported for pivotal movement from an opening and from a stored position to an operative position. The hook member has a hook portion adapted to support a garment when the hook member is in the operative position. The hook member has a closure portion fixed for pivotal movement with the hook portion, the closure portion blocking the opening when the hook member is in the operative position. The apparatus also comprises a latch mechanism for releasably holding the hook member in the stored position. The latch mechanism is responsive to a pushing force on the hook member when the hook member is in the stored position to release the hook member for pivotal movement from the stored position to the operative position.

BRIEF DESCRIPTION OF THE DRAWINGS

The foregoing and other features of the invention will become more apparent to one skilled in the art upon consideration of the following description of the invention and the accompanying drawings, in which:

FIG. 5 is a fragmentary view of a latch portion of the coat hook assembly of FIG. 1, shown in the second condition; and FIG. 6 is a view similar to FIG. 5 showing the latch portion of the coat hook assembly in the first condition.

DETAILED DESCRIPTION OF THE INVENTION

Figure 2:
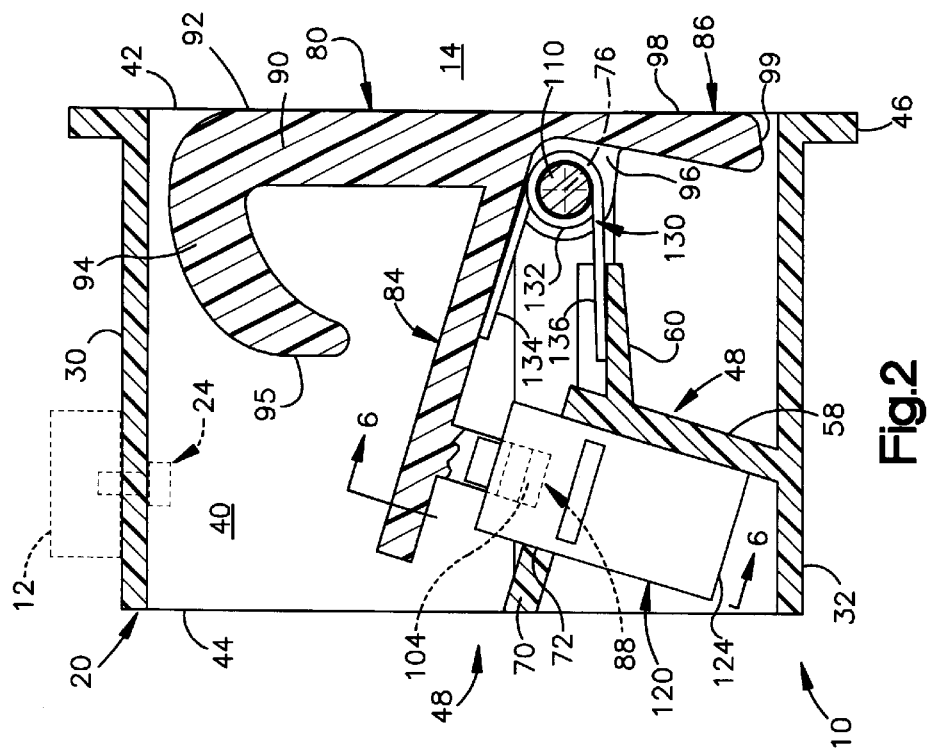
FIG. 2 is a sectional view of the coat hook assembly of FIG. 1, shown in a first condition.
Figure 1:
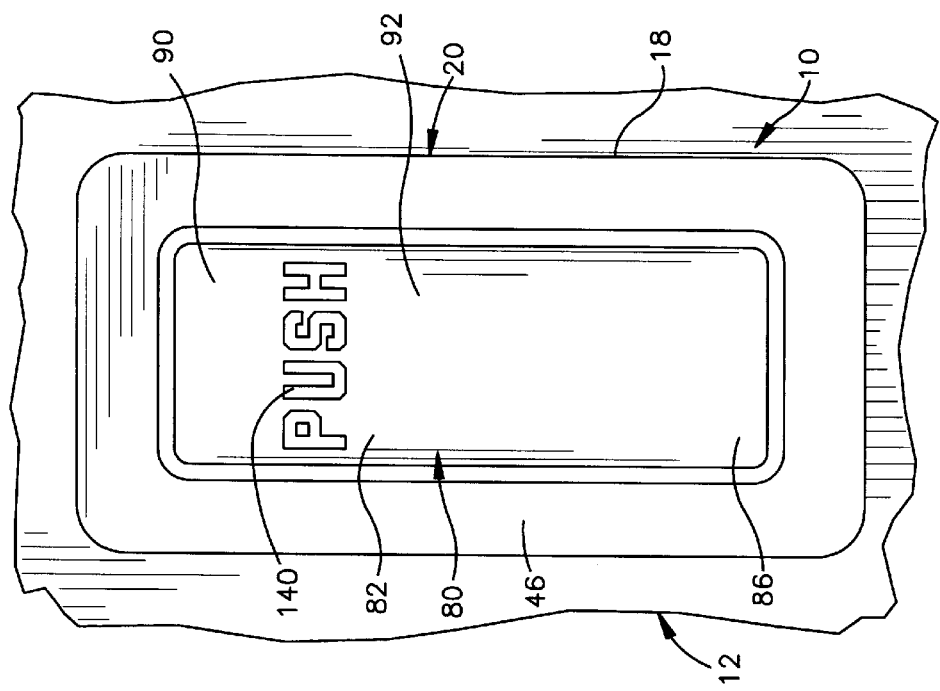
FIG. 1 is a front elevational view of a coat hook assembly in accordance with the present invention.
Figure 3:
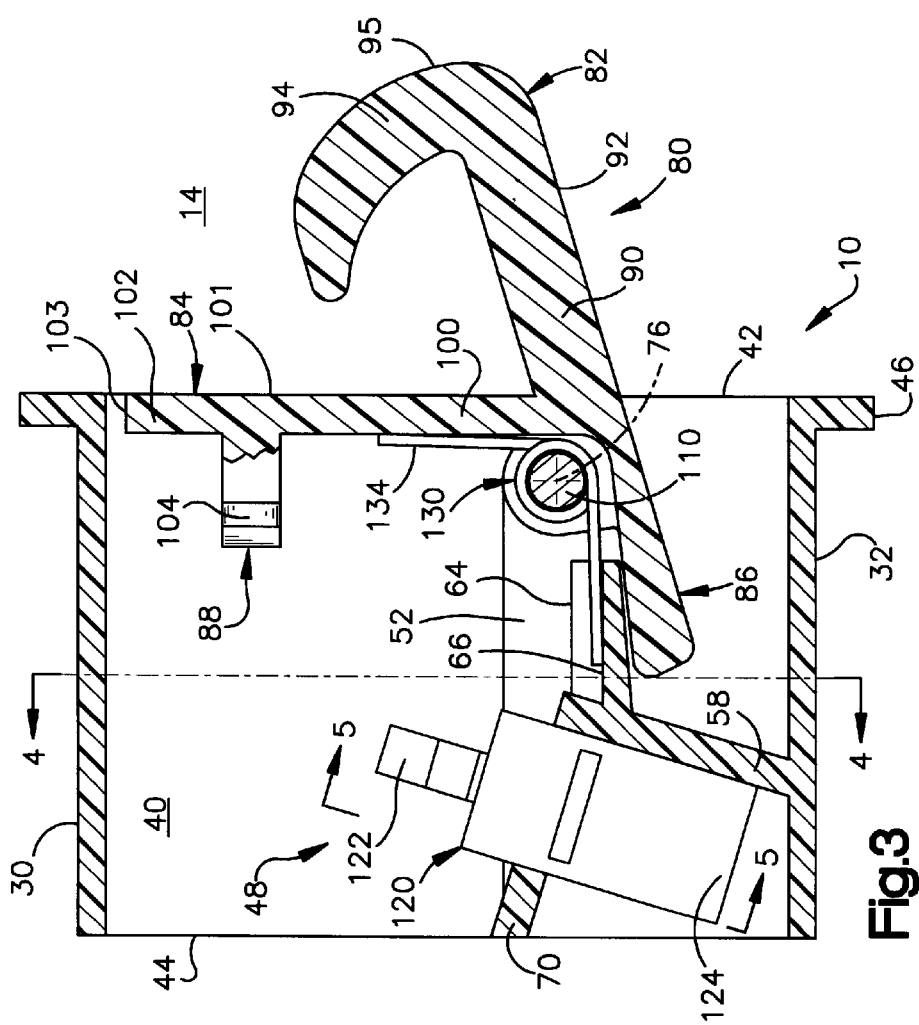
FIG. 3 is a sectional view of the coat hook assembly of FIG. 1, shown in a second condition.

The present invention relates to a retractable coat hook and, in particular, to a retractable coat hook for connection with a structure, such as a wall panel or an automobile. The invention is applicable to various coat hook assemblies. As representative of the invention, FIG. 1 illustrates a coat hook assembly 10 that is mounted on or connected with a structure 12 (a portion of which is shown). The structure portion 12 may be a portion of a wall panel or modular furniture panel. The structure portion 12 may, alternatively, be a portion of a piece of furniture, or a vehicle portion such as a portion of a roof area panel adjacent a roof rail of the vehicle. The structure portion 12 including the coat hook assembly 10 is adjacent a personal usage area 14 (FIGS. 2 and 3). As a result, the coat hook assembly 10 is engageable from, and usable in, the personal usage area 14. The coat hook assembly 10 is mounted in an opening 18 in the structure portion 12 as described below.

The coat hook assembly 10 (FIGS. 2 and 3) includes a support 20. The support 20 is a part of the coat hook assembly 10 that is secured to the structure portion 12, and that supports the other parts of the coat hook assembly on the structure portion. The support 20 has a main body portion in the form of a box 22 that is adapted to be recessed in the structure portion 12. The box 22 is secured to the structure portion 12 with one or more fasteners shown schematically at 24 in FIG. 2, or in any other suitable manner.

The box 22 includes four walls, specifically, top and bottom walls 30 and 32, and first and second side walls 34 and 36. The front and the rear of the box 22 are open.

Each one of the walls 30–36 has a rectangular configuration. All four of the walls 30–36 have the same depth. The height of the side walls 34 and 36 of the box 22 is greater than the width of the top and bottom walls 30 and 32. As a result, the box 22 has an upright, rectangular configuration, taller than it is wide.

The top and bottom walls 30–32 of the box 22 are parallel to each other. The side walls 34 and 36 are parallel to each other, and perpendicular to the top and bottom walls 30 and 32.

The four walls 30–36 of the box 22 define a cavity or opening or chamber 40 in the box. The front edges of the four walls 30–36 define a front opening 42 into the chamber 40. The back edges of the four walls 30–36 define a back opening 44 into the chamber 40.

The support 20 includes a covering flange 46 that extends outward from the front edges of the four side walls 30–36. The covering flange 46 is adapted to overlie the outer side surface of the structure portion 12 and cover the edges on the structure portion that define the opening 18 in which the support 20 is received.

The support 20 includes an internal portion 48 that is disposed inside the chamber 40 in the box 22. The internal portion 48 is adapted to support the other parts of the coat hook assembly 10 on the support 20. Specifically, the internal portion 48 is adapted to support a hook member 80, a pivot pin 110, and a latch mechanism 120 on the support 20.

The internal portion 48 includes a pair of side ribs 50 and 52. The first side rib 50 extends from front to back along an inner side surface 54 of the first side wall 34 of the box 22, at a location about one-third of the way up from the bottom wall 32. The second side rib 52 extends from front to back along an inner side surface 56 of the second side wall 36 of the box 22, at a location about one-third of the way up from the bottom wall 32.

The internal portion 48 of the support 20 further includes a bottom leg 58 that extends upward from the bottom wall 32 of the box 22, at a location about two thirds of the distance from the front opening 42 of the box to the back opening 44. The bottom leg 58 has a planar configuration and extends laterally between and is supported by the first and second side walls 34 and 36 and the first and second side ribs 50 and 52. The bottom leg 58 is tipped forward in the chamber 40, with its upper edge portion being closer to the front opening 42 of the box 22 than to the back opening 44 of the box.

The internal portion 48 of the support 20 also includes a stop leg 60. The stop leg 60 has a planar configuration and extends from the upper end portion of the bottom leg 58, in a direction toward the front opening 42 of the box 22. The stop leg 60 extends laterally between and is supported by the first and second side walls 34 and 36. The stop leg 60 extends about one half of the way forward in the chamber 40 from the bottom leg 58. The stop leg 60 has two spaced apart locator ribs 62 and 64 extending from front to back along an upper side surface 66 of the stop leg 60.

The internal portion 48 of the support 20 also includes a latch support leg 70. The latch support leg 70 has a planar configuration and extends from the upper end portion of the bottom leg 58 toward the back opening 44 of the box 22. The latch support leg 70 extends laterally between and is supported by the first and second side ribs 50 and 52 on the first and second side walls 34 and 36. The latch support leg 70 has a latch mechanism opening 72 for receiving the latch mechanism 120.

Figure 4:
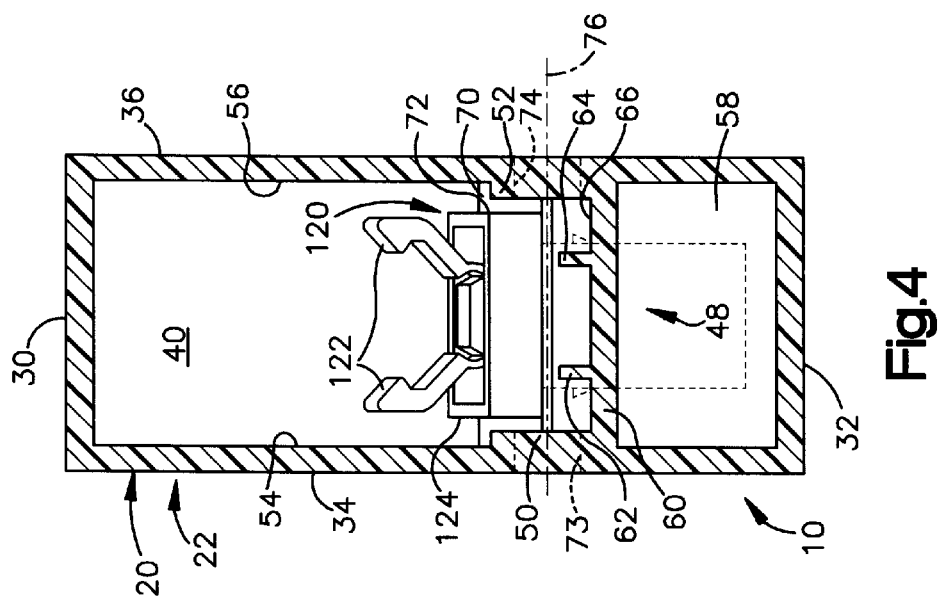
FIG. 4 is a sectional view taken generally along line 4—4 of FIG. 3.

The support 20 has two pivot pin openings 73 and 74 (FIG. 4). The first pivot pin opening 73 extends through the first side wall 34 and the first side-rib 50 of the box 22. The second pivot pin opening 74 extends through the second side wall 36 and the second side rib 52 of the box 22. The pivot pin openings 73 and 74 define a pivot axis 76 of the coat hook assembly 10.

The hook member 80, described below in detail, includes a hook portion 82 for supporting a garment in the personal usage area 14. The hook member 80 also includes a closure portion, or closure panel, 84 for blocking visibility of the chamber 40 in the support 20 from the personal usage area 14. The hook member 80 further includes a stop portion 86 for limiting pivotal movement of the hook member relative to the support 20. Finally, the hook member 80 includes a latch portion 88 for engagement with the latch mechanism 120 to control latching of the hook member.

The hook member 80 may be made from the same material as the support 20, or may be made from a different material. The hook member 80 is formed as one piece, preferably by plastic injection molding.

The hook portion 82 of the hook member 80 has a rectangular, generally planar main body portion 90 with an outer side surface 92. A curved end portion 94 extends from the main body portion 90 and has an upper terminal end 95. The main body portion 90 and the end portion 94 together provide the hook portion 82 with a J-shaped configuration that is adapted to receive and support a garment or a garment hanger when the hook member 80 is in the operative position shown in FIG. 3.

The hook member 80 also has a pivot portion 96 that receives the pivot pin 110. The pivot portion 96 is located between the hook portion 82 and the stop portion 86. The pivot portion 96 comprises a boss having an opening that is adapted to receive therethrough the pivot pin 110.

The stop portion 86 of the hook member 80 extends from the pivot portion 96 in a direction opposite the hook portion 82. Thus, the stop portion 86 is generally co-planar with or formed as an extension of the main body portion 90 of the hook portion 82. The stop portion 86 has an outer side surface 98 that is an extension of the outer side surface 92 of the hook portion 82. The stop portion 86 gradually increases in thickness as it extends from the pivot portion 96. The stop portion 86 has a lower terminal end 99 of the hook member 80.

The stop portion 86 is adapted to span the distance between the pivot portion 96 and the bottom wall 32 of the box 22 when the hook member 80 is in the stored position shown in FIG. 2. At the same time, the hook portion 82 is adapted to span the distance between the pivot portion 96 and the top wall 30 of the box 22 when the hook member 80 is in the stored position. The stop portion 86 is adapted to engage a lower side surface of the stop leg 60 of the support 20, when the hook member 80 is in the operative position shown in FIG. 3.

The closure portion 84 of the hook member 80 extends transversely to the hook portion 82, at a predetermined angle relative to the hook portion. The predetermined angle is the same or substantially the same, as the angle through which the hook member 80 pivots when moving between the stored position and the operative position.

In the illustrated embodiment, the closure portion 84 extends at about a seventy five degree angle to the hook portion 82. The closure portion 84 extends from the hook portion 82 just above the pivot portion 96. The closure portion 84 is fixed for pivotal movement with the hook portion 82. The closure portion 84 of the hook member 80 is always spaced the same distance from the hook portion 82, regardless of the position of the hook member.

The closure portion 84 has an inner end portion 100 adjacent the pivot portion 96, and an opposite outer end portion 102. The closure portion 84 has a rectangular, generally planar configuration. The closure portion 84 is adapted to span the distance between the pivot portion 96 and the top wall 30 of the box 22 when the hook member 80 is in the operative position. The closure portion 84 has an outer side surface 101 and a terminal end 103.

The latch portion 88 of the hook member 80 extends from the closure portion 84, near the outer end portion 102 of the closure portion. The latch portion 88 is adapted to engage and be retained by the latch mechanism 120, as described below. The latch portion 88 is formed as a tab projecting from the closure portion 84, and has an enlarged head portion 104 for engagement with and retention by the latch mechanism 120.

The pivot pin 110 has an elongate, cylindrical configuration. The pivot pin 110 extends through the pivot pin portion 96 of the hook member 80. A first end portion of the pivot pin 110 is received and supported in the first pivot pin opening 73 in the first side wall 34 of the support 20. A second end portion of the pivot pin 110 is received and supported in the second pivot pin opening 74 in the second side wall 36 of the support 20.

The pivot pin 110 supports the hook member 80 on the support 20 for pivotal movement relative to the support about the pivot axis 76. The hook member 80 is pivotable relative to the support 20, about the axis 76, between the stored position shown in FIG. 2 and the operative position shown in FIG. 3.

The latch mechanism 120 (FIGS. 2–6) is a push-push type mechanism that is engageable with the latch portion 88 of the hook member 80 to help control the position of the hook member. The push-push mechanism 120 has a latched condition in which it grabs or grips the latch portion 88 of the hook member 80 and retains the hook member in the stored position shown in FIG. 2. The push-push mechanism 120 has an unlatched condition in which the latch portion 88 of the hook member 80 is spaced apart from the latch mechanism 120.

The latch mechanism 120 may be a known, off the shelf part, such as Part No. 42-005018-AA obtainable from ITW Produx (an Illinois Tool Works Company) of 3700 West Lake Avenue, Glenview, Ill. 60025. The structure of the latch mechanism 120 is shown only partially and schematically because it is a known structure with a known mode of operation. The latch mechanism 120 includes two prongs (shown schematically at 122) that move into and out of a latch housing 124 during the push-push operation. The two prongs 122 are engageable with the enlarged head portion 104 of the latch portion 88 of the hook member 80, to grip the latch portion when the prongs are retracted into the latch housing 124.

The coat hook assembly 10 also includes at least one torsion spring 130. The torsion spring 130 has a central portion 132 encircling the pivot pin 110. A first end portion 134 of the torsion spring 130 extends upward from the central portion 132, along the inner side surface of the closure portion 84 of the hook member 80. A second end portion 136 of the torsion spring 130 extends laterally outward (to the left as viewed in FIGS. 2 and 3), and abuttingly engages the stop leg 60 of the support 20. The second end portion 136 of the spring 130 is maintained in position laterally on the stop leg 60 by the ribs 62 and 64. The spring 130 biases the hook member 80 for pivotal movement from the stored position to the operative position, that is, in a clockwise direction as viewed in FIGS. 2 and 3.

FIG. 2 illustrates the parts of the coat hook assembly 10 in the closed condition. The hook member 80 is in the stored position. The latch portion 88 of the hook member 80 is engaged with the latch mechanism 120 (FIG. 6) to maintain the hook member in the stored position.

The main body portion 90 of the hook portion 82 of the hook member 80 extends parallel to the front edges of the four side walls 30–36 of the support 20. The outer side surface 92 of the main body portion 90 is approximately co-planar with the front edges of the side walls 30–36, that is, with the front opening 42 of the box 20. The outer side surface 98 of the stop portion 86 of the hook member 80 is also, thereby, approximately co-planar with the front edges of the side walls 30–36 and/or with the front opening 42 of the box 20.

The upper terminal end 95 of the hook member 80 is adjacent the top wall 30 of the support 20. The lower terminal end 99 of the hook member 80 is adjacent the bottom wall 32 of the support 20. As a result, the hook member 80 blocks visibility of substantially all of the chamber 40, and the internal portion 48 of the support 20, from the personal usage area 14.

To move the hook member 80 from the stored position to the operative position, a person exerts briefly a pushing force on the outer side surface 92 of the main body portion 90 of the hook member 80, at the location marked with the legend PUSH at 140 (FIG. 1). This pushing force causes the hook member 80 to pivot a small amount in a counterclockwise direction as viewed in FIGS. 2 and 3 relative to the support 20. As a result, the latch portion 88 of the hook member 80 moves farther into the latch mechanism 120, releasing the latch mechanism in a known manner.

When the pushing force is released, the biasing force of the torsion spring 130 then causes the hook member 80 to pivot in a clockwise direction as viewed in FIGS. 2 and 3, from the stored position shown in FIG. 2 to the operative position shown in FIG. 3. The pivoting movement of the hook member 80 is stopped by the engagement of the stop portion 86 of the hook member 80 with the lower side surface of the stop leg 60 of the support 20.

When the hook member 80 is thus in the operative position, the outer side surface 101 of the closure portion 84 of the hook member 80 is approximately co-planar with the front edges of the side walls 30–36 and/or with the front opening 42 of the box 22. The terminal end 103 of the closure portion 84 is adjacent the upper wall 32 of the support 20. As a result, the closure portion 84 of the hook member 70 blocks visibility, from the personal usage area 14, of the portion of the chamber 40 that is disposed above the pivot axis 76. Because the pivot axis 76 is relatively close to the bottom wall 32, this constitutes most of the chamber 40.

To return the hook member 80 from the operative position to the stored position, the person again exerts a pushing force on the hook portion 82 of the hook member. This force causes the hook member 80 to pivot in a counterclockwise direction as viewed in FIGS. 2 and 3.

The hook member 80 pivots, and the pushing force continues to be applied, until the latch portion 88 of the hook member 80 moves into the latch mechanism 120. The head portion 104 of the latch leg 88 is captured by the prongs 122 of the latch mechanism 120. When thus in the stored position again, the hook member 80 blocks visibility of the chamber 40 and the internal portions 48 of the coat hook assembly 10, as discussed above.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus comprising:
   a support adapted for connection with a structure, the support at least partially defining a chamber having an opening;
   a hook member pivotally connected to said support and pivotal relative to said support about a pivot axis and between a stored position and an operative position;
   said hook member having a hook portion adapted to support a garment when said hook member is in the operative position;
   said hook member having a closure portion fixed for pivotal movement with said hook portion, said closure portion extending upwardly from said hook portion and blocking substantially all of an upper portion of said opening when said hook member is in the operative position, said upper portion of said opening being located above said pivot axis; and
   a latch mechanism for releasably holding said hook member in the stored position, said latch mechanism being responsive to a pushing force on said hook member when said hook member is in the stored position to release said hook member for pivotal movement from the stored position to the operative position.

2. The apparatus of claim 1 wherein said hook portion of said hook member is adapted to block substantially all of said upper portion of said opening when said hook member is in the stored position.

3. The apparatus of claim 2 wherein said hook member further includes a stop portion, said stop portion being adapted to block substantially all of a lower portion of said opening when said hook member is in the stored position, said lower portion of said opening being located below said pivot axis.

4. The apparatus of claim 3 wherein said support includes a stop leg, said stop portion of said hook member engaging said stop leg of said support when said hook member is in the operative position.

5. The apparatus of claim 4 further including a torsion spring having first and second leg portions, said first leg portion of said torsion spring engaging said stop leg of said support and said second leg portion of said torsion spring engaging said closure portion of said hook member for urging said hook member toward the operative position.

6. The apparatus of claim 1 further including a biasing member, said biasing member acting on said hook member to rotate said hook member from the stored position to the operative position.

7. The apparatus of claim 1 wherein said closure portion of said hook member is formed as one piece with said hook portion of said hook member, said closure portion and said hook portion diverging from one another in an area adjacent the pivot axis.

8. The apparatus of claim 6 wherein said latch mechanism is responsive to a pushing force at a location on said hook member above said pivot axis when said hook member is in the stored position to release said hook member for pivotal movement from the stored position to the operative position.

9. The apparatus of claim 8 wherein said latch comprises a push-push mechanism having a latched condition and an unlatched condition;

said push-push mechanism being actuatable from the latched condition to the unlatched condition to release said hook member for pivotal movement from the stored position to the operative position in response to a first pushing force exerted on said hook member when said hook member is in the stored position;

said push-push mechanism being actuatable from the unlatched condition to the latched condition to maintain said hook member in the stored position in response to a second pushing force exerted on said hook member when said hook member is in the operative position.

10. The apparatus of claim 1 wherein said closure portion is further formed as one piece with a projection from said closure portion, said projection including a portion for engaging and interlocking with said latch mechanism to maintain said hook member in the stored position.

11. The apparatus of claim 1 wherein a distance between said closure portion of said hook member and said hook portion of said hook member, when said hook member is in the stored position, is the same as the distance between said closure portion of said hook member and said hook portion of said hook member when said hook member is in the operative position.

12. An apparatus comprising:
a support having a chamber, a front surface of said support located in a plane, an opening to said chamber located in the plane;
a hook pivotally connected to said support and pivotal relative to said support about a pivot axis and between a stored position and an operative position;
said hook member having a hook portion which is adapted to support a garment when said hook member is in the operative position and which is located in the plane closing an upper portion of said opening when said hook member is in the stored position, an upper portion of said opening being located above said pivot axis;
said hook member having a closure portion fixed for pivotal movement with said hook portion, said closure portion being located in the plane closing the upper portion of said opening when said hook member is in the operative position and
a latch mechanism located within the chamber for releasably holding said hook member in the stored position, said latch mechanism being responsive to a pushing force on said hook member when said hook member is in the stored position to release said hook member for pivotal movement from the stored position to the operative position.

13. The apparatus of claim 12 wherein said hook member further includes a stop portion, said stop portion being located in the plane and closing a lower portion of said opening when said hook member is in the stored position, said lower portion of said opening being located below said pivot axis.

14. The apparatus of claim 13 wherein said support includes a stop leg, said stop portion of said hook member engaging said stop leg of said support when said hook member is in the operative position.

15. The apparatus of claim 14 further including a torsion spring having first and second leg portions, said first leg portion of said torsion spring engaging said stop leg of said support and said second leg portion of said torsion spring engaging said closure portion of said hook member for urging said hook member toward the operative position.

16. The apparatus of claim 12 further including a biasing member, said biasing member acting on said hook member to rotate said hook member from the stored position to the operative position.

17. The apparatus of claim 12 wherein said closure portion of said hook member is formed as one piece with said hook portion of said hook member, said closure portion and said hook portion diverging from one another in an area adjacent the pivot axis.

18. The apparatus of claim 12 wherein said latch mechanism is responsive to a pushing force at a location on said hook member above said pivot axis when said hook member is in the stored position to release said hook member for pivotal movement from the stored position to the operative position.

19. The apparatus of claim 18 wherein said latch mechanism comprises a push-push mechanism having a latched condition and an unlatched condition;

said push-push mechanism being actuatable from the latched condition to the unlatched condition to release said hook member for pivotal movement from the stored position to the operative position in response to a first pushing force exerted on said hook member when said hook member is in the stored position;

said push-push mechanism being actuatable from the unlatched condition to the latched condition to maintain said hook member in the stored position in response to a second pushing force exerted on said hook member when said hook member is in the operative position.

20. The apparatus of claim 12 wherein said closure portion is further formed as one piece with a projection from said closure portion, said projection including a portion for engaging and interlocking with said latch mechanism to maintain said hook member in the stored position.

21. The apparatus of claim 12 wherein a distance between said closure portion of said hook member and said hook portion of said hook member, when said hook member is in the stored position, is the same as the distance between said closure portion of said hook member and said hook portion of said hook member when said hook member is in the operative position.

* * * * *

UNITED STATES PATENT AND TRADEMARK OFFICE
CERTIFICATE OF CORRECTION

PATENT NO. : 6,663,067 B2 Page 1 of 1
DATED : December 16, 2003
INVENTOR(S) : Gary G. Gordon It is certified that error appears in the above-identified patent and that said Letters Patent is hereby corrected as shown below:

Column 7,
Line 19, after "claim" change "6" to -- 1 --.

Signed and Sealed this

Eleventh Day of May, 2004

JON W. DUDAS
*Acting Director of the United States Patent and Trademark Office*